United States Patent
La Torre et al.

(10) Patent No.: US 9,635,829 B2
(45) Date of Patent: May 2, 2017

(54) CONNECTOR, AND A TEATCUP

(71) Applicants: Carlos La Torre, Tumba (SE); Anneli Lidmar, Huddinge (SE); Michael Persson, Tullinge (SE)

(72) Inventors: Carlos La Torre, Tumba (SE); Anneli Lidmar, Huddinge (SE); Michael Persson, Tullinge (SE)

(73) Assignee: DELAVAL HOLDING AB, Tumba (SE)

( * ) Notice: Subject to any disclaimer, the term of this patent is extended or adjusted under 35 U.S.C. 154(b) by 152 days.

(21) Appl. No.: 14/366,271

(22) PCT Filed: Dec. 20, 2012

(86) PCT No.: PCT/SE2012/051467
§ 371 (c)(1),
(2) Date: Jun. 18, 2014

(87) PCT Pub. No.: WO2013/095290
PCT Pub. Date: Jun. 27, 2013

(65) Prior Publication Data
US 2014/0360432 A1    Dec. 11, 2014

Related U.S. Application Data

(60) Provisional application No. 61/579,061, filed on Dec. 22, 2011.

(30) Foreign Application Priority Data

Dec. 22, 2011 (SE) ...................................... 1151251

(51) Int. Cl.
*A01J 5/08* (2006.01)
*A01J 5/04* (2006.01)

(52) U.S. Cl.
CPC *A01J 5/044* (2013.01); *A01J 5/08* (2013.01)

(58) Field of Classification Search
CPC ...... A01J 5/08; A01J 5/044; A01J 5/04; A01J 5/06; A01J 5/16; A01J 5/10
(Continued)

(56) References Cited

U.S. PATENT DOCUMENTS 1,959,581 A    5/1934    Hapgood
2,073,737 A *  3/1937    Ellison ...................... A01J 5/06
                                                         119/14.49

(Continued)

FOREIGN PATENT DOCUMENTS

CA    2068834        11/1992
CH    272561 A       12/1950
(Continued)

OTHER PUBLICATIONS

CN Office Action, dated Jul. 3, 2015; Application No. 201280063292.2.
(Continued)

*Primary Examiner* — Kathleen Alker
*Assistant Examiner* — Jeffrey R Larsen
(74) *Attorney, Agent, or Firm* — Young & Thompson

(57) ABSTRACT

A connector and a teatcup that includes a connector and a cartridge. The cartridge includes a sleeve, having a first end and a second end, and a teatcup liner mounted in the sleeve and having an inner space for receiving a teat. The connector is configured to connect a milk conduit to the cartridge. The connector includes a casing, which defines a longitudinal center axis (x) and encloses a connection space. The casing has an inner surface facing the connection space. The casing includes an inlet opening for the cartridge to the connection space, and an outlet opening for the milk conduit. Locking parts are provided on the inner surface of the casing and
(Continued)

configured to permit locking of the cartridge in the connector.

11 Claims, 3 Drawing Sheets

(58) Field of Classification Search
USPC ......... 119/14.51, 14.47, 14.49, 14.18, 14.46, 119/14.36, 14.38, 14.37, 14.44, 14.07, 119/14.19, 14.21
See application file for complete search history.

(56) References Cited

U.S. PATENT DOCUMENTS

| | | | |
|---|---|---|---|
| 2,502,956 A | 4/1950 | Jansson | |
| 4,459,939 A | 7/1984 | Noorlander | |
| 5,245,947 A | 9/1993 | Oosterling et al. | |
| 6,176,200 B1* | 1/2001 | Petterson | A01J 5/08 119/14.47 |
| 6,308,656 B1* | 10/2001 | Milbrath | A01J 5/08 119/14.47 |
| 7,650,854 B2 | 1/2010 | Petterson et al. | |
| 7,921,806 B2 | 4/2011 | Petterson et al. | |
| 2013/0239899 A1* | 9/2013 | Alveby | A01J 5/08 119/14.15 |

FOREIGN PATENT DOCUMENTS

| | | |
|---|---|---|
| EA | 008546 B1 | 6/2007 |
| EP | 0457993 | 11/1991 |
| EP | 0 511 723 A2 | 11/1992 |
| EP | 0513932 | 11/1992 |
| EP | 1 795 068 A1 | 6/2007 |
| EP | 1 806 050 A1 | 7/2007 |
| GB | 284236 A | 3/1929 |
| GB | 402663 A | 12/1933 |
| JP | H04222529 | 8/1992 |
| SU | 1277931 A1 | 12/1986 |
| WO | 92/22197 A1 | 12/1992 |
| WO | 93/13651 A2 | 7/1993 |
| WO | 01/45498 A1 | 6/2001 |
| WO | 2005/120216 A1 | 12/2005 |

OTHER PUBLICATIONS

International-Type Search Report, dated Jul. 9, 2012, from corresponding PCT application.
International Search Report, dated May 8, 2013, from corresponding PCT application.
Supplementary International Search Report, dated Mar. 28, 2014, from corresponding PCT application.
Japanese Office Action dated Sep. 9, 2016, with English Translation; Application No. 2014-548740.

* cited by examiner

CONNECTOR, AND A TEATCUP

TECHNICAL FIELD OF THE INVENTION

The present invention refers generally to teatcups to be attached to the teats of animals to be milk. More precisely, the present invention refers to a connector configured to be comprised by a teatcup according to the preamble of claim 1. The present invention also refers to a teatcup to be attached to a teat of an animal to be milked according to the preamble of claim 11.

BACKGROUND OF THE INVENTION AND PRIOR ART

Teatcups used today typically consists of two separate main parts, a shell and a teatcup liner mounted in the shell. A pulsation chamber is provided between the shell and the teatcup liner. The teatcup liner is an article of consumption that is subjected to wear, and thus has to be replaced on a regular basis. The replacement of the teatcup liner is a time-consuming and difficult work, requiring dismounting of the teatcup liner from the shell and mounting of a new teatcup liner in the shell. The teatcup liner may form one single part either together with the short milk conduit or separate from the short milk conduit.

Traditionally, the teatcup liner forms one single part together with the short milk conduit. In order to enable replacement of only the barrel of the teatcup liner, it is know to produce teatcup liners being separate from the milk conduit. In such teatcups, there is a difficulty in the connection of the teatcup liner including the barrel to the separate short milk conduit. Especially, it is difficult to provide an easy mounting and dismounting of the barrel to the milk conduit without leakage between the milk channel and the surrounding, and between the milk channel and the pulsation chamber.

U.S. Pat. No. 7,921,806 discloses a connector configured to be comprised by a teatcup to be attached to a teat of an animal to be milked. The connector is configured to connect a milk conduit to a cartridge comprising a sleeve, having a first end and a second end, and a teatcup liner mounted in the sleeve and having an inner space for receiving the teat. The connector defines a longitudinal axis and comprises a casing, which has an inner surface and defines a connection space, an inlet opening configured for receiving the cartridge to the connection space, and an outlet opening for the milk conduit. Resilient clamping members are provided to extend around and grip the cartridge.

U.S. Pat. No. 4,459,939 discloses a connector configured to be comprised by a teatcup to be attached to a teat of an animal to be milked. The connector is configured to connect a milk conduit to a cartridge comprising a sleeve, having a first end and a second end, and a teatcup liner mounted in the sleeve and having an inner space for receiving the teat. The connector defines a longitudinal centre axis and comprises a casing, which has an inner surface and defines a space, an inlet opening configured for receiving the cartridge to the connection space, and an outlet opening receiving a rigid milk nipple.

EP-511 723 discloses a teatcup to be attached to a teat of an animal to be milked. A lower part of the teatcup is configured to connect a milk conduit to an upper part comprising a sleeve, having a first end and a second end, and a teatcup liner mounted in the sleeve and having an inner space for receiving the teat. The teatcup defines a longitudinal axis. The lower part comprises a casing, which has an inner surface and defines a space, an inlet opening in which the upper part is mounted, and an outlet opening for the milk conduit.

SUMMARY OF THE INVENTION

The object of the present invention is to overcome the problems discussed above and to provide a connector that enables a convenient, quick and secure connection of a teatcup liner to a milk conduit.

This object is achieved by the connector defined above, which is characterised in that the looking means is provided on the inner surface of the casing and configured to permit locking of the cartridge in the connector.

Such locking means on the inner surface of the casing permit quick and easy dismounting of the cartridge from the connector and the milk conduit, and quick and secure mounting and locking of the cartridge in the connector, thereby establishing a tight milk passage from the inner space of the teatcup liner to a milk channel defined by the milk conduit.

According to an embodiment of the invention, the locking means comprises a bayonet coupling part. Advantageously, a corresponding bayonet coupling part is provided on an outer surface of the cartridge.

According to a further embodiment of the invention, the outlet opening is configured to receive and hold the milk conduit. Advantageously, the casing may comprise a bottom wall through which the outlet opening extends. The milk conduit may then be introduced in the outlet opening. The bottom wall may be configured to engage a circumferential groove on the milk conduit. Moreover, the bottom wall may be is plane, and extend perpendicularly to the longitudinal centre axis.

According to a further embodiment of the invention, the longitudinal centre axis extends through the inlet opening and the outlet opening.

According to a further embodiment of the invention, the connector comprises an outer shell extending beyond the inlet opening of the casing. Such an outer shell may be configured to protect the cartridge located inside the outer shell when the cartridge I mounted in the connector. Advantageously, the outer shell may be attached to and enclose an end portion of the casing.

According to a further embodiment of the invention, the casing comprises an aperture extending through the casing into the connection space and a holding member configured to hold a pulse conduit in a flow communication with the aperture for communicating a pulsating vacuum to the connection space.

The object is also achieved by the teatcup initially defined, which is characterised in that locking means is provided on the inner surface of the casing and configured to permit locking of the cartridge in the connector.

By means of such a teatcup, comprising at least two separate parts, the cartridge and the connector, the replacement of the cartridge, including teatcup liner, may be facilitated since the cartridge may be simply disengaged from the connector and replaced by a new cartridge, which is then mounted to the connector. No loosening of external conduits from the connector is required when replacing the cartridge. The cartridge, which has been removed from the connector, may then be thrown away as a waste product.

According to a further embodiment of the invention, cartridge comprises corresponding locking means provided on an outer side of the sleeve and configured to co-act with the locking means of the casing to establish said locking of the cartridge in the teatcup connector. Advantageously, the locking means comprises at least one outer bayonet coupling part on the inner surface of the casing, and the corresponding locking means comprises at least one inner bayonet coupling part on the outer surface of the cartridge, the outer and inner bayonet coupling parts forming a bayonet coupling permitting easy dismounting and mounting of the cartridge from the connector.

According to a further embodiment of the invention, the sleeve comprises a hole extending through the sleeve and positioned in the connection space, and wherein the casing comprises an aperture extending through the casing and a holding member configured to hold a pulse conduit in order to permit flow communication of a pulsating vacuum from the pulse conduit to the pulsation chamber. Advantageously, a sealing ring may be provided between the outer surface of the sleeve and the casing, thereby sealing the connection space from the surrounding atmosphere, and wherein the hole is provided between the sealing ring and the lower end of the sleeve.

BRIEF DESCRIPTION OF THE DRAWINGS

The present invention will now be explained more closely by means of a description of various embodiments and with reference to the drawings attached hereto.

DETAILED DESCRIPTION OF VARIOUS EMBODIMENTS OF THE INVENTION

Figure 1:
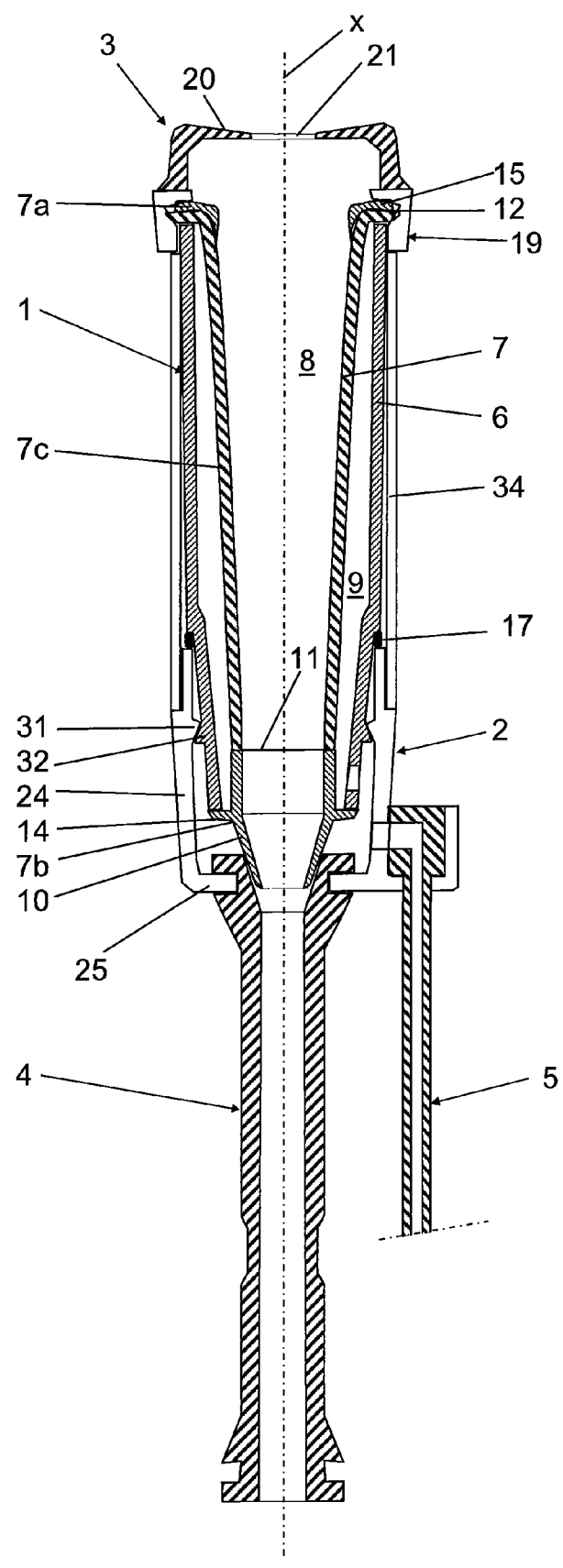
FIG. 1 discloses a longitudinal section of a teatcup comprising or connected to a milk conduit.

FIG. 1 discloses a teatcup to be attached to a teat of an animal to be milked. The teatcup comprises a cartridge 1 and a connector 2. The teatcup may also comprise a lip member 3. In addition, the teatcup may comprise or be connected to a milk conduit 4, such as a short milk conduit. Moreover, the teatcup may comprise or be connected to a pulse conduit 5.

A longitudinal centre axis x extends through and along the teatcup, i.e. the cartridge 1, the connector 2 and the lip member 3. The longitudinal centre axis x also extends through and along the milk conduit 4 when it is in a rest state as disclosed in FIG. 1.

Figure 2:
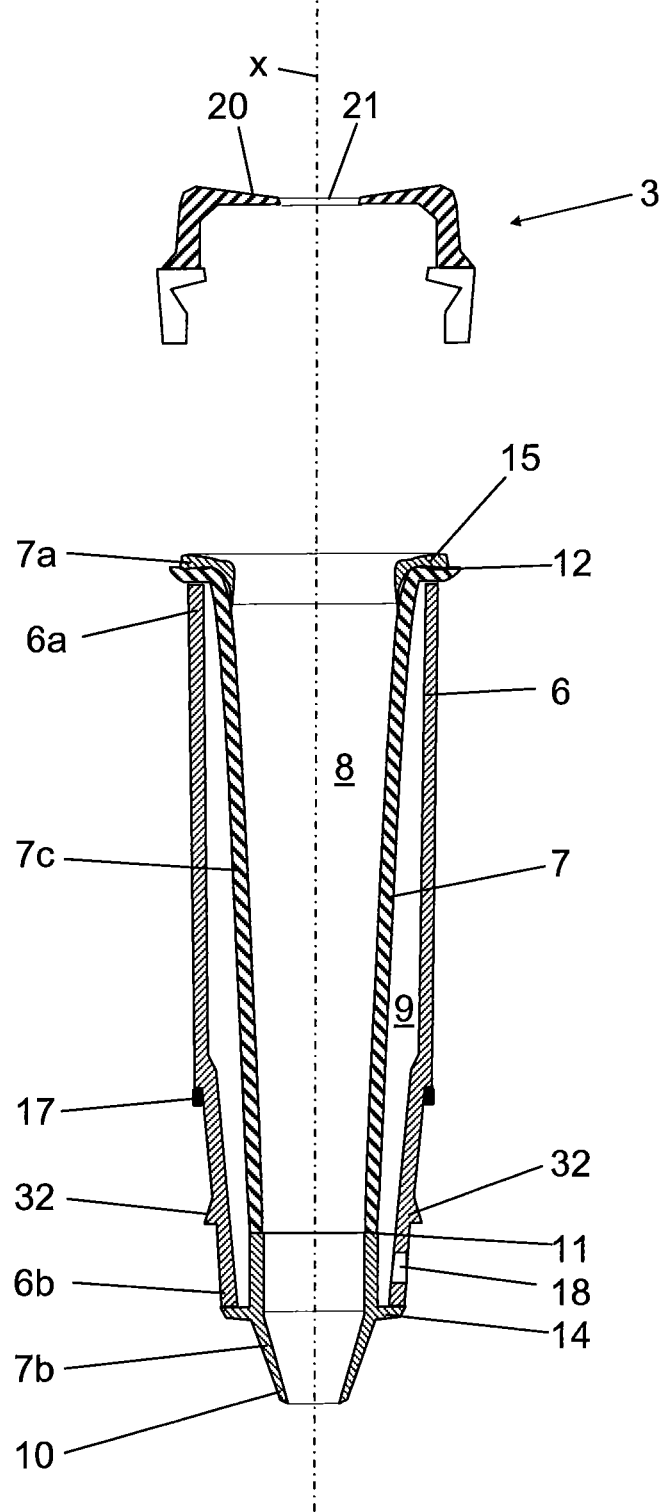
FIG. 2 discloses an exploded longitudinal section of a cartridge of the teatcup in FIG. 1.

The cartridge 1, see also FIG. 2, comprises a sleeve 6 having an upper end 6a and a lower end 6b, and a teatcup liner 7 mounted in the sleeve 6. In FIGS. 1 and 2, the cartridge is shown in a mounted state, i.e. the teatcup liner 7 is mounted in the sleeve 6. The teatcup liner 7 has or forms an inner space 8 for receiving the teat. A pulsation chamber 9 is provided or formed between an inner side of the sleeve 6 and an outer side of the teatcup liner 7.

The teatcup liner 7 comprises an upper end portion 7a located at the upper end 6a of the sleeve 6, a barrel portion 7c and a lower end portion 7b located at the lower end of the sleeve 6. The barrel portion 7c is an intermediate tubular portion provided between and adjoining the upper end portion 7a and the lower end portion 7b. The barrel portion 7c is the main part of the teatcup liner 7 and is in contact with the teat of the animal during milking.

The lower end portion 7b extends from a position within the sleeve 6 away from and beyond the lower end 6b of the sleeve 6. The lower end portion 7b forms an end nozzle 10. The end nozzle 10 is the part of the lower end portion 7b that extends beyond the lower end 6b of the sleeve 6. The end nozzle 10 forms an outlet from the inner space 8.

The end nozzle 10 has a tapering external shape configured to be received in the milk conduit 4 for transporting the milk from the inner space 8 to the milk conduit 4. The end nozzle 10 also has a tapering internal shape forming a tapering outlet for the milk from the inner space 8 of the teatcup liner 7.

The barrel portion 7c of the teatcup liner 7 is made of a first material having a relatively high elasticity. The lower end portion 7b of the teatcup liner 7 is made of a second material, which is different from the first material and has a different composition. The second material has a relatively low elasticity in comparison with the relatively high elasticity of the first material of the barrel portion 7c.

The first material may consist of or comprise rubber, black rubber, silicone rubber, elastic polymers, such as Thermoplastic Elastomers, TPE, or any other suitable elastic material.

The second material may consist of or comprise a suitable polymer with low elasticity, such as polyeten, polypropene, etc.

The upper end portion 7a is made in a third material having a relatively low elasticity in comparison with the relatively high elasticity of the first material of the barrel portion 7c. The third material may be a material having similar or the same composition and/or properties as the second material of the lower end portion 7b.

The barrel portion 7c is attached to the lower end portion 7b by a lower permanent joint 11. Such a permanent joint 11 may be formed by a melt joint, a weld joint or a chemical bonding between the first material and the second material.

The barrel portion 7c is also attached to the upper end portion 7a by an upper permanent joint 12. Such a permanent joint 12 may be formed by a melt joint, a weld joint or a chemical bonding between the first material and the third material.

The lower and/or upper permanent joints 11, 12 my be formed by melting of at least one of the first material and the second material at the permanent joint. The lower and/or upper permanent joints 11, 12 may also be obtained through vulcanisation.

Alternatively, the barrel portion 7c and the lower end portion 7b and/or the upper end portion 7a are made of the same material, for instance in one single piece, preferably through injection moulding.

The sleeve 6 is made of a fourth material having a relatively low elasticity. The fourth material may be a material having similar or the same composition and/or properties as the same material as the second material.

The lower end portion 7b of the teatcup liner 7 comprises a lower engagement member 14, which engages the sleeve 6 in such a manner that the barrel portion 7c of the teatcup liner 7 is maintained in a stretched state in the sleeve 6. The lower engagement member 14 comprises, or is formed as, an annular flange extending outwardly at least beyond an inner diameter of an end surface of the lower end 6b of the sleeve 6. The annular flange of the lower end portion 7b may extend radially or substantially radially outwardly with respect to the longitudinal centre axis x. The annular flange of the lower end portion 7b extends beyond and abuts the end surface of the lower end 6b of the sleeve 6.

The upper end portion 7a of the teatcup liner 7 comprises an upper engagement member 15, which engages the sleeve 6 at the upper end 6a of the sleeve 6. The upper engagement member 15 comprises, or is formed as, an upper annular flange extending outwardly at least beyond an inner diameter of an end surface of the upper end 6a of the sleeve 6. The annular flange of the upper engagement member 15 may extend radially or substantially radially outwardly with respect to the longitudinal centre axis x. In the embodiment disclose, the annular flange of the upper engagement member 15 of the upper end portion 7a abuts an outwardly bent part of the first material of the barrel portion 7c, which in turn abuts the end surface of the upper end 6a of the sleeve 6.

The sleeve 6 comprises a sealing ring 17 extending around an outer surface of the sleeve 6. The sealing ring 17 is configured to engage a surface, especially an end surface, of the connector 2, as will be described below.

Moreover, the sleeve 6 comprises a hole 18 through the sleeve 6, or through the wall of the sleeve 6. The hole 18 permits a pulsating vacuum to be applied in the pulsation chamber 9. The hole 18 is provided between the sealing ring 17 and the lower end 6b of the sleeve 6.

The lip member 3 is in the embodiment disclosed attached to the upper end portion 7a of the teatcup liner 7, as can be seen in FIGS. 1 and 2. The lip member 3 is preferably detachably attached to the cartridge 1 by a snap connection 19. In FIG. 2 the lip member 3 is shown in a detached state with respect to the teatcup liner 7 and the cartridge 1. Alternatively, the lip member 3 may be detachably attached to the sleeve 6.

The lip member 3 comprises or forms a lip 20, which surrounds and defines an opening 21 for the teat to the inner space 8. The lip 20 is also made of a relatively elastic material, possibly a material having similar or the same composition and/or properties as the first material of the barrel portion 7c.

It is to be noted that the lip member or the lip 20 as an alternative may form an integrated part of the teatcup liner 7, preferably by being permanently joined to the upper end portion 7a, or being manufactured in one single piece with the upper end portion 7a or with the teatcup liner 7.

Figure 4:
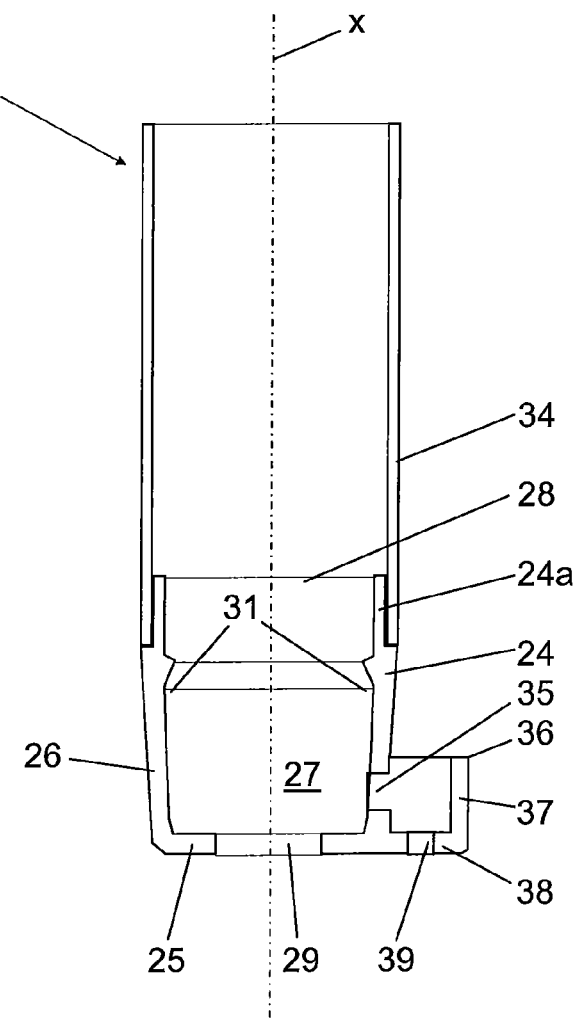
FIG. 4 discloses a section of a connector of the teatcup in FIG. 1.

The connector 2, see also FIG. 4, comprises a casing 24, which has a bottom wall 25 and a surrounding wall 26 having an inner surface. The casing 24 defines a connection space 27. The bottom wall 25 is plane or substantially plane.

The connector 2, or the casing 24, comprises an inlet opening 28 for the cartridge 1 to the connection space 27, and an outlet opening 29 for the milk conduit 4. The outlet opening 29 extends through the bottom wall 25 and is configured to receive and hold the milk conduit 4. In the embodiment disclosed, the longitudinal centre axis x extends concentrically through the casing 24 and through the inlet opening 28 and the outlet opening 29, wherein the bottom wall 25 extends perpendicularly, or substantially perpendicularly to the longitudinal centre axis x.

The connector 2 is connected to the cartridge 1 by means of locking means. The locking means is provided on the inner surface of the surrounding wall 26. Corresponding locking means is provided on the outer side of the sleeve 6. The corresponding locking means is provided between the sealing ring 17 and the lower end 6b of the sleeve 6. The locking means may comprise on or more outer bayonet coupling parts 31 on the inner surface of the casing 24. The corresponding locking means may comprise one or more inner bayonet coupling parts 32 on the outer surface of the sleeve 6 of the cartridge 1. The outer bayonet coupling parts 31 and the inner bayonet coupling parts 32 form a bayonet coupling permitting secure locking of the cartridge 1 in the connector 2.

Furthermore, the connector 2 comprises an outer shell 34 extending beyond the inlet opening 28 of the casing 24. The outer shell 34 is tubular and attached to an end portion 24a of the casing 24. The purpose of the outer shell 34 is to protect the cartridge 1. The outer shell 34 may be made of a relatively rigid material, for instance as plastics or metal, such as stainless steel.

The casing 24 also comprises an aperture 35 extending through the casing 24 into the connection space 27. Furthermore, the connector 2 or the casing 24 comprises a holding member 36 configured to hold the pulse conduit 5 in a flow communication with the aperture 35 and the pulsating chamber 9 via the hole 18 for communicating a pulsating vacuum to the connection space 27 and to the pulsating chamber 9. The holding member defines a holding space, which is partly defined by a side wall 37 and a bottom wall 38. An opening 39 extends through the bottom wall 38.

Figure 3:
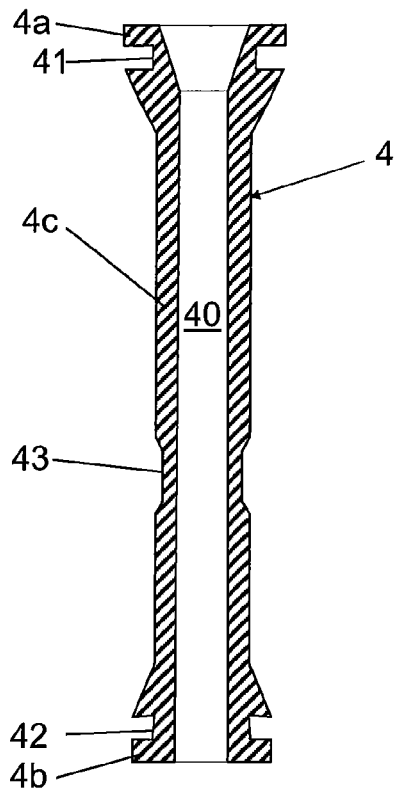
FIG. 3 discloses a section of the milk conduit in FIG. 1.

The milk conduit 4, or short milk conduit, see also FIG. 3, is tubular and comprises a first end portion 4a defining a first end, a second end portion 4b defining a second end, and a conduit portion 4c between the first end portion 4a and the second end portion 4b. The milk conduit 4 defines a milk channel 40 extending through the first end portion 4a, the conduit portion 4c and the second end portion 4b.

The first end of the milk conduit 4 may be defined or formed by a plane, or substantially plane, end surface from which the milk channel 40 extends.

The first end portion 4a of the milk conduit 4 has an external tapering shape from the first end to the conduit portion 4c. The milk conduit 4 thus has a greater outer diameter at the first end compared to the outer diameter at the conduit portion 4c.

The first end portion 4a is configured to be received in the outlet opening 29 extending through the bottom wall 25 of the connector 2 of the teatcup. The first end portion 4a comprises a first circumferential groove 41 configured to engage the bottom wall 25, see FIG. 1. The first circumferential groove 41 is positioned at a distance from the first end and at a distance from the conduit portion 4c.

The milk channel 40 of the first end portion 4a has an internal tapering shape from the first end towards the milk channel 40 of the conduit portion 4c.

The second end portion 4b comprises a second circumferential groove 42, which is configured to be received in any suitable milk-receiving member or milk-collecting member, such as a claw, not disclosed. The second circumferential groove 42 is positioned at a distance from the second end and at a distance from the conduit portion 4c. Also the second end portion 4b has an external tapering shape from the second end to the conduit portion 4c.

The milk conduit 4 is made of a hose material having a relatively high elasticity in the order of the elasticity of the first material of the barrel portion. For instance, the milk conduit 4 may be manufactured of natural rubber, black rubber, silicone rubber or Thermoplastic Elastomers, TPE. The conduit portion 4c comprises an bending area 43 having a locally decreased outer diameter, and thus a locally increased elasticity to provide a predetermined area for bending of the milk conduit 4.

Figure 5:
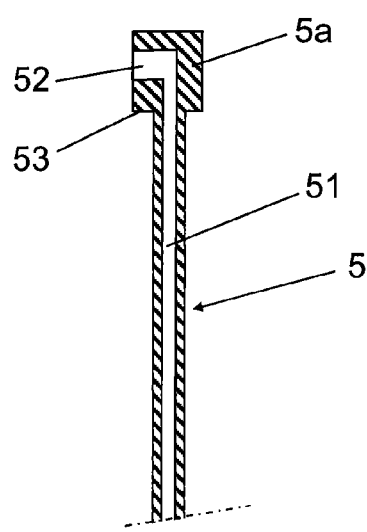
FIG. 5 discloses a section of a pulse conduit of the teatcup in FIG. 1.

Also the pulse conduit 5, see also FIG. 5, may be made of a hose material having a relatively high elasticity, possibly the same hose material as the material of the milk conduit 4. The pulse conduit 5 has a attachment end portion 5a to be engaged by the holding member 36. The pulse conduit 5 defines or encloses a pulse channel 51 extending along the pulse conduit 5 through the attachment end portion 5a. The attachment end portion 5a defines an opening 52 of the pulse channel 51. When the pulse conduit 5 is engaged by the holding member 36, the opening 52 is positioned opposite to the opening 35 through the casing 24.

The attachment end portion 5a is configured to be received in an opening extending through the bottom wall 38 of the holding member 36. The attachment end portion 51 has a bottom surface 53 configured to abut the bottom wall 38, see FIG. 1, when the pulse conduit 5 is mounted in the connector 2.

The assembling of the teatcup is now to be described. One assembling step is to produce the cartridge 1, wherein the teatcup liner 7 is mounted in the sleeve 6. This mounting may be made in advance in connection with the manufacturing of the teatcup. The teatcup liner 7 is then pulled through the sleeve 6, wherein the lower end portion 7b is introduced at the upper end 6a of the sleeve and pushed and pulled downwardly so that the lower end portion 7b passes the lower end 6b until the lower engagement member 14 snaps outwardly to abutment against the end surface of the lower end 6 of the sleeve 6. Thanks to the upper engagement member 15, the upper end portion 7a will not pass through the upper end 6a of the sleeve 6, but the engagement members 14 and 15 secure that the teatcup liner 7 and its barrel portion 7c is retained in a stretched state in the sleeve 6. In the stretched state, the teatcup liner 7 is prolonged in comparison with a rest state, in which the teatcup liner 7 is not subjected to any external forces, i.e. before the teatcup liner 7 is mounted in the shell 6.

Thereafter the lip member 3 may be attached to the cartridge 1, wherein the lip member 3 is pressed onto the upper end 6a of the sleeve 6 so that the snap connection 19 locks the lip member 3 in a detachable manner on the cartridge 1.

The cartridge 1 is a replaceable component, together with or without the lip member 3, depending on the wear of the lip 21. The cartridge 1 and the lip member 3 are the components of the teatcup that are subjected to significant wear.

A further assembling step is the assembling of the connector 1. The outer shell 34 may be mounted to the casing 24 in advance or after mounting of the milk conduit 5 and the pulse conduit 5. The milk conduit 4 is mounted to the connector 2 by the introduction of the second end portion 4b through the inlet opening 28 and then through the outlet opening 29. The milk conduit 4 is then pulled through the connector 2 until the lower wall 25 of the casing 24 snaps into the first circumferential groove 41. The tapering shape of the first end portion 4a facilitates the pulling of the milk conduit 4 into the snapping-in engagement.

In a similar manner, the pulse conduit 5 is mounted to the connector 2 by being pulled through the holding member 36 until the bottom surface 53 comes to abutment against the bottom wall 38, wherein the opening 52 of the pulse channel 51 is opposite to the opening 35 through the casing 24.

The teatcup is then present as two main components, namely the cartridge 1 together with the lip member 3, and the connector 2 together with the milk conduit 4 and the pulse conduit 5. The milk conduit 4 and the pulse conduit 5 may be mounted to their respective components of the remaining milking equipment in any suitable manner. The milk conduit 4 may for instance be mounted by engagement of the second circumferential groove 42.

Finally, these two main components are connected to each other. The cartridge 1, with or without the lip member 3, is then introduced into the connection space 27 of the connector 2 until the end nozzle 10 penetrates the milk channel 40 at the first end portion 41, and abuts tightly the wall of the milk channel 40. Thanks to the shape of the end nozzle 19 and to the relatively low elasticity of the end nozzle 10 in combination with the relatively high elasticity of the milk conduit 4 a tight connection is achieved.

In this position of the cartridge 1 vis-à-vis the connector 2, the end surface of the casing 24 will abut the sealing ring 17 so that the space formed between the sleeve 6 and the casing 24 is tightly sealed, thereby permitting proper communication of the pulsating vacuum. It is to be noted that the sealing ring 17 alternatively may be provided on the connector 2, especially on the casing 24.

When the cartridge 1 has reach this position vis-à-vis the milk conduit, the cartridge is locked in the connector 2, by means of the bayonet coupling, i.e. the coupling of the outer bayonet coupling part 31 and the inner bayonet coupling part 32. This coupling may be achieved through a turning of the cartridge 1 in relation to the connector 2. It is to be noted that the coupling and locking of the cartridge 1 to the connector 2 may also be achieved by other locking means, e.g. a thread connection.

The present invention is not limited to the embodiments disclosed but may be varied and modified within the scope of the following claims.

The terms "upper" and "lower" used in the description and the claims refer to the orientation disclosed in the figures and the approximate orientation when the teatcup is attached to the teat of an animal.

LIST OF REFERENCE SIGNS 1 cartridge
2 connector
3 lip member
4 milk conduit
4a first end portion
4b second end portion
4c conduit portion
5 pulse conduit
5a attachment end portion sleeve
6a upper end
6b lower end
7 teatcup liner
7a upper end portion
7b lower end portion
7c barrel portion
8 inner space
9 pulsation chamber
10 end nozzle
11 lower permanent joint
12 upper permanent joint
14 lower engagement member
15 upper engagement member
17 sealing ring
18 hole
19 snap connection
20 lip
21 opening
24 casing
25 bottom wall
26 surrounding wall
27 connection space
28 inlet opening
29 outlet opening
31 outer bayonet coupling part 32 inner bayonet coupling part
34 outer shell
35 aperture
36 holding member
37 side wall
38 bottom wall
40 milk channel
41 first circumferential groove
42 second circumferential groove
43 bending area
51 pulse channel
52 opening
53 attachment circumferential groove

The invention claimed is:

1. A teatcup connector that removably connects to i) a cartridge (1) comprising a sleeve (6) having a top first end (6a) and a bottom second end (6b) and a hole (18) that extends through the bottom second end (6b), and a teatcup liner (7) mounted in the sleeve (6) and having an inner space (8) for receiving said teat, and ii) a milk conduit (4) that transports milk and connects to the teatcup liner (7), said teatcup connector comprising:
   a casing (24) that defines a longitudinal center axis (x) and encloses a connection space (27), the casing comprising
   i) an inlet opening (28) that accepts a lower part the cartridge (1) within the connection space (27),
   ii) a surrounding wall (26) with an inner surface facing the connection space (27) and an aperture (35) that extends through the surrounding wall (26) into the connection space (27),
   iii) a bottom wall (25) with an outlet opening (29) that extends through the bottom wall (25), and
   iv) an outer shell (34) that extends upward beyond the inlet opening (28), the outer shell protecting the cartridge (1) when the cartridge (1) is mounted in the casing (24); and
   a sealing ring (17) that, when the cartridge (1) is mounted in the casing (24), is located between an outer surface of the sleeve (6) and the casing (24) sealing the connection space from surrounding atmosphere,
   wherein, when the cartridge (1) is mounted in the casing (24), the hole (18) that extends through the bottom second end (6b) of the sleeve (6) is located between the sealing ring and a lower end of the sleeve (6), the hole (18) and the aperture (35) that extends through the surrounding wall (26) providing a path for a pulsating vacuum to be applied in a pulsation chamber (9) formed between an inner side of the sleeve (6) and an outer side of the teatcup liner (7),
   wherein the outlet opening (29) that extends through the bottom wall (25) has an inward facing edge that, with the lower part the cartridge (1) within the connection space (27) and the teatcup liner (7), sealed in tight abutment against the milking conduit (4), holds with snapping-in engagement an outwardly facing groove (41) of the milking conduit (4) against the inward facing edge of the outlet opening (29) with the milk conduit (4) extending through the outlet opening (29), and
   wherein the casing (24) further comprises, on the inner surface of the surrounding wall (26) facing the connection space (27), a first locking element (31) that, when engaged with a corresponding second locking element (32) on an outer surface of the sleeve (6) of the cartridge (1), releasably locks the cartridge (1) within the connector (2).

2. The connector according to claim 1, wherein the first locking element is a bayonet coupling part located on the inner surface facing the connection space (27) between the sealing ring (17) and the bottom wall (25).

3. The connector according to claim 1, wherein,
   the lowermost surface of the bottom wall (25) is plane, and
   the longitudinal center axis (x) extends through the inlet opening (28) and the outlet opening (29).

4. The connector according to claim 1, wherein the outer shell (34) extends downward over the inlet opening (28) of the casing (24).

5. The connector according to claim 4 in combination with the cartridge and the milk conduit, wherein,
   the teatcup liner (7) comprises an upper end portion (7a) located at the top first end (6a) of the sleeve (6), a barrel portion (7c), and a lower end portion (7b) located at the bottom second end (6b) of the sleeve (6),
   the barrel portion (7c) is an intermediate tubular portion provided between and adjoining the upper end portion (7a) and the lower end portion (7b) and is a main part of the teatcup liner (7) that is in contact with the teat of the animal during milking,
   the lower end portion (7b) extends from a position within the sleeve (6) and includes an end nozzle (10) that extends away from and beyond the lower end (6b) of the sleeve (6), the end nozzle (10) defining an outlet from the inner space (8), the end nozzle (10) having a decreasing tapered external shape and a decreasing tapered internal shape forming a decreasing tapered outlet for the milk from the inner space (8) of the teatcup liner (7), and
   the milk conduit (4) comprises
   a) a first end portion (4a) defining a first end connected to the connector (2), the first end portion (4a) comprising the outward facing first circumferential groove (41) snap fit onto and engaging the inward facing edge of the bottom wall (25) that defines the outlet opening (29) such that the outlet opening (29) receives the outward facing first circumferential groove (41) and holds the milk conduit (4) extending through the outlet opening (29),
   b) a second end portion (4b) defining a second end, and
   c) a conduit portion (4c) located between the first end portion (4a) and the second end portion (4b),
   wherein the milk conduit (4) defines a milk channel (40) extending through the first end portion (4a), the conduit portion (4c), and the second end portion (4b),
   wherein the first end portion (4a) further includes
   i) an external surface with a decreasing tapered external shape from the first end toward the conduit portion (4c), the first circumferential groove (41) being located along the decreasing tapered external shape of the external surface, wherein the decreasing tapered external shape of the external surface facilitates mounting of the milk conduit by a pulling movement to snap fit the first circumferential groove (41) onto and engaging the edge of the bottom wall (25) at the outlet opening (29), and
   ii) an internal surface with a decreasing tapered internal shape from the first end towards the conduit portion (4c),
   wherein the first circumferential groove (41) is located, in a cross section of the first end portion, surrounding internal surface with the decreasing tapered internal shape, wherein the decreasing tapered external shape of the end nozzle (10) is received in the internal surface with the decreasing tapered internal shape of the first end portion (4a) of the milk conduit (4), and wherein internal surface with the decreasing tapered internal shape of the first end portion (4a) provides a radial seal with the decreasing tapered external shape of the end nozzle (10) received therein with the decreasing tapered external shape of the end nozzle (10) penetrating in tight abutment with the internal surface with the decreasing tapered internal shape of the first end portion (4a) of the milk conduit (4).

6. The connector according to claim 1, wherein the casing (24), in a region below the first locking element (31) comprises i) a holding member (36) configured to hold a pulse conduit (5) in a flow communication with the aperture (35) for communicating the pulsating vacuum to the connection space (27), and, via the hole (18), to the pulsation chamber (9).

7. The connector according to claim 6 in combination with the pulse conduit, the cartridge and the milk conduit, wherein the first and second locking elements are facing coupling parts that co-act together to removably lock the cartridge (1) in the connector (2).

8. The combination according claim 6, wherein the sealing ring (17) is located above the first and second locking elements.

9. The connector according to claim 1 in combination with the cartridge and the milk conduit.

10. The combination according claim 9, wherein the sealing ring (17) is located below the top first end (6a) of the sleeve (6).

11. An assembly comprising:
a teatcup connector;
a cartridge (1) comprising a sleeve (6) having a top first end (6a) and a bottom second end (6b) and a hole (18) that extends through the bottom second end (6b), and a teatcup liner (7) mounted in the sleeve (6) and having an inner space (8) for receiving said teat;
a sealing ring (17); and
a milk conduit (4) that transports milk and connects to the teatcup liner (7), the teatcup connector comprising a casing (24) which defines a longitudinal center axis (x) and encloses a connection space (27), the cartridge (1) being removably mounted in the casing (24), the casing comprising i) an inlet opening (28) that accepts a lower part the cartridge (1) within the connection space (27), ii) a surrounding wall (26) with an inner surface facing the connection space (27) and an aperture (35) that extends through the surrounding wall (26) into the connection space (27), iii) a bottom wall (25) with an outlet opening (29) that extends through the bottom wall (25), and iv) an outer shell (34) that extends upward beyond the inlet opening (28), the outer shell protecting the cartridge (1) mounted in the casing (24), wherein the sealing ring (17) is located between an outer surface of the sleeve (6) and the casing (24) sealing the connection space from surrounding atmosphere, wherein, the hole (18) that extends through the bottom second end (6b) of the sleeve (6) is located between the sealing ring and a lower end of the sleeve (6), the hole (18) and the aperture (35) that extends through the surrounding wall (26) providing a path for a pulsating vacuum to be applied in a pulsation chamber (9) formed between an inner side of the sleeve (6) and an outer side of the teatcup liner (7), wherein the outlet opening (29) that extends through the bottom wall (25) holds the milking conduit (4) with the milk conduit (4) extending through the outlet opening (29), and wherein the casing (24) further comprises, on the inner surface of the surrounding wall (26) facing the connection space (27), a first locking element (31) that, when engaged with a corresponding second locking element (32) on an outer surface of the sleeve (6) of the cartridge (1), releasably locks the cartridge (1) within the connector (2).

* * * * *